(12) United States Patent
Lautenschläger et al.

(10) Patent No.: US 11,464,086 B2
(45) Date of Patent: Oct. 4, 2022

(54) PRESSURE VESSEL WITH MAGNETIC DISK FOR STIRRING

(71) Applicant: MWT AG, Heerbrugg (CH)

(72) Inventors: Werner Lautenschläger, Auerstrasse (CH); Jens Lautenschläger, Heerbrugg (CH); Werner Scholze, Isny (DE)

(73) Assignee: MWVT AG, Heerbrugg (CH)

( * ) Notice: Subject to any disclaimer, the term of this patent is extended or adjusted under 35 U.S.C. 154(b) by 532 days.

(21) Appl. No.: 16/528,913

(22) Filed: Aug. 1, 2019

(65) Prior Publication Data

US 2020/0045785 A1    Feb. 6, 2020

(30) Foreign Application Priority Data

Aug. 2, 2018  (DE) ............... 20 2018 104 457.5

(51) Int. Cl.
*H05B 6/78*  (2006.01)
*H05B 6/68*  (2006.01)
(Continued)

(52) U.S. Cl.
CPC ............. *H05B 6/78* (2013.01); *H01F 7/20* (2013.01); *H05B 6/6402* (2013.01);
(Continued)

(58) Field of Classification Search
CPC .... B01J 2219/00141; B01J 3/004; B01J 3/03; B01J 3/04; B01J 3/042; B01L 2300/185; B01L 2300/1866; B01L 3/5082; B01L 7/02; B01L 9/06; H01F 7/20; H05B 6/6402; H05B 6/6473; H05B 6/68; H05B 6/78; H05B 6/804; H05B 6/806
(Continued)

(56) References Cited

U.S. PATENT DOCUMENTS 6,084,226 A * 7/2000 Greene ............... B01J 19/126
                                                 219/710
8,460,615 B2  6/2013 Persson et al.
(Continued)

FOREIGN PATENT DOCUMENTS

DE        19700499 A1    6/1998

OTHER PUBLICATIONS

Machine translation of DE 197 00 499 A1 to Lautenschlager.

*Primary Examiner* — Quang T Van
(74) *Attorney, Agent, or Firm* — The H.T. Than Law Group (57) ABSTRACT

The present invention relates to a pressure vessel (1) for receiving samples (P) to be heated, having a reaction chamber (2) as a pressure space for the initiation and/or facilitation of chemical and/or physical pressure reactions, the reaction chamber (2) being designed for receiving a liquid (5), a magnetic disk (8) mounted rotatably about an axis of rotation in the reaction chamber (2), and a magnet arrangement (10), provided outside the reaction chamber (2), for generating a rotating magnetic field for rotationally driving the magnetic disk (8) about its axis of rotation, the magnetic disk (8) having at least one passage bore (13), which extends transversely in relation to the axis of rotation and is provided in such a way that liquid (5) received in the reaction chamber (2) is driven through the passage opening (13) by rotation of the magnetic disk (8) in order to stir the liquid (5).

21 Claims, 4 Drawing Sheets (51) Int. Cl.
  *H05B 6/80* (2006.01)
  *H01F 7/20* (2006.01)
  *H05B 6/64* (2006.01)

(52) U.S. Cl.
  CPC ............ *H05B 6/6473* (2013.01); *H05B 6/68* (2013.01); *H05B 6/804* (2013.01); *H05B 6/806* (2013.01)

(58) Field of Classification Search
  USPC ....... 219/681, 601, 682, 679, 695, 690, 702, 219/710, 712, 716, 718, 753, 754; 315/111.51; 422/21
  See application file for complete search history.

(56) References Cited

U.S. PATENT DOCUMENTS

| | | |
|---|---|---|
| 8,808,636 B2 | 8/2014 | Persson et al. |
| 2006/0141614 A1* | 6/2006 | Puskeiler .......... B01F 15/00071 435/289.1 |
| 2012/0171718 A1* | 7/2012 | Le .......................... C12M 27/10 435/41 |

\* cited by examiner

PRESSURE VESSEL WITH MAGNETIC DISK FOR STIRRING

FIELD OF THE INVENTION

The invention relates to a pressure vessel for receiving samples to be heated, having a reaction chamber as a pressure space for the initiation and/or facilitation of chemical and/or physical pressure reactions.

BACKGROUND OF THE INVENTION

Pressure vessels of the type mentioned at the beginning are known from the prior art. In order to heat the samples received in the pressure vessel, generally microwaves are coupled into the reaction chamber of the pressure vessel. It may also be provided that the samples thus received in the pressure vessel are heated indirectly by way of a liquid received in the reaction chamber. The efficiency of the heating of the samples consequently also depends to a great extent on the state of the liquid. It has in this respect been found in particular that the process of heating the samples by way of the liquid is relatively slow and inefficient.

It is consequently an object of the invention to provide a pressure vessel of the type mentioned at the beginning with which samples can be heated more efficiently.

SUMMARY OF THE INVENTION

The object is achieved according to the invention by the features of the independent claim. Advantageous developments are the subject of the subclaims dependent on this preceding claim.

A pressure vessel according to the invention for receiving samples to be heated has: a reaction chamber as a pressure space for the initiation and/or facilitation of chemical and/or physical pressure reactions, the reaction chamber being designed for receiving a liquid; a magnetic disk mounted rotatably about an axis of rotation in the reaction chamber; and a magnet arrangement, provided outside the reaction chamber, for generating a rotating magnetic field for rotationally driving the magnetic disk about its axis of rotation. The magnetic disk has at least one passage bore, which extends transversely in relation to the axis of rotation and is provided in such a way that liquid received in the reaction chamber is driven through the passage opening by rotation of the magnetic disk in order to stir the liquid.

In other words, in particular the passage bore, which passes through the rotating magnetic disk transversely in relation to the axis of rotation, has the effect of bringing about a pressure difference between the openings of the passage bore. Because of this pressure difference, the liquid received in the reaction chamber is consequently driven through the passage opening, so that the liquid is stirred or agitated (also known as the propeller effect). In this way, more efficient stirring, in particular more homogeneous mixing, and consequently more efficient heating of the liquid and samples received in the reaction chamber can be accomplished. In this way, a more uniform temperature distribution is also achieved in the liquid or the samples. What is more, such a magnetic disk or stirring device can be easily produced, to be specific by simply drilling through the magnetic disk a passage bore extending transversely in relation to the axis of rotation. On account of the simple geometry of the magnetic disk, a stirring means with little imbalance is also provided.

Preferably, the at least one passage bore passes through the magnetic disk at least partly in an upward direction and away from the axis of rotation or toward the axis of rotation. In this way, the passage bore can be easily provided in the magnetic disk. What is more, in this way the liquid can run through the passage bore without bends provided therein, so that the liquid runs through the passage bore quickly. This in turn has a positive influence on the stirring effect of the magnetic disk.

The at least one passage bore may pass through the magnetic disk at least partly in a direction inclined tangentially to or counter to the turning direction about the axis of rotation. In other words, the extent of the passage bore may have a component of its extent which, seen in the direction of the axis of rotation of the magnetic disk, is tangential to an imaginary circle that is drawn by turning of the magnetic disk. Consequently, liquid can be driven through the passage bore by the turning of the magnetic disk or by the torque of the magnetic disk that acts on the liquid provided in the passage bore. What is more, in this way the direction of the flow of the liquid through the passage bore can be changed by changing the turning direction of the magnetic disk.

The at least one passage bore may pass through the magnetic disk at least partly in a direction inclined radially toward or away from the axis of rotation. In other words, the extent of the passage bore may have a (further) component of its extent which, seen in the direction of the axis of rotation of the magnetic disk, runs in the direction or counter to the radius of a (or the) imaginary circle drawn by turning of the magnetic disk. The passage bore therefore then has two openings, provided on the magnetic disk, one of the openings being arranged closer to the axis of rotation of the magnetic disk than the other of the openings. Rotation of the magnetic disk consequently has the effect of bringing about a pressure at the opening arranged closer to the axis of rotation that is different from the pressure that prevails at the opening further away from the axis of rotation, that is to say in particular is higher. This means that liquid can be driven through the passage bore by the centrifugal force that is brought about by the turning of the magnetic disk and acts on the liquid provided in the passage bore.

Advantageously, the magnetic disk has at least two, preferably three, particularly preferably four, passage bores. In this way the aforementioned stirring effect can be intensified still further. It is preferred if the at least two passage bores are distributed uniformly around the axis of rotation of the magnetic disk. In this way, a uniform stirring, and consequently a uniform warming, of the liquid is brought about in particular.

The pressure vessel may also have a plate, which is provided in the reaction chamber and is permeable to the liquid, the plate defining with the reaction chamber a space in which the magnetic disk is mounted. The permeability of the plate to the liquid may take place for example by way of holes provided in the magnetic disk. This produces a simple mounting for the magnetic disk, which can be provided in particular without further mounting means provided separately from the magnetic disk.

Preferably, the plate is produced from a ceramic material, which preferably comprises silicon carbide (SiC). These materials are in particular dimensionally stable, resistant to chemicals and resistant to temperature, and are therefore suitable in a particularly advantageous way for the reactions occurring in the pressure vessel. Aforementioned materials are also distinguished by their ability to be highly absorbent to microwaves. If, therefore, like the magnetic disk, the plate is provided in the liquid, the plate is heated by microwave absorption, and consequently gives off heat to the liquid surrounding the plate. In this way, the liquid is heated particularly quickly and efficiently. What is more, a more homogeneous temperature distribution is consequently set in the liquid. And since the plate is also intended for mounting the magnetic disk, both heating of the liquid and mounting of the magnetic disk can take place with just one plate, whereby the efficiency of the heating is increased and the number of components necessary for this is reduced.

The reaction chamber and/or the plate may have a region for mounting the magnetic disk. To reduce the necessary components for mounting the magnetic disk, this region may in particular be provided integrally on the respective part. In this way, the magnetic disk is held in a defined position in relation to the reaction chamber and/or the plate, to be precise without additional, separately provided means.

The pressure vessel may also have at least one sample container for receiving a sample, the sample container being held in the reaction chamber in order to be warmed by the liquid received in the reaction chamber when the liquid has been received in the reaction chamber. The at least one sample container is then preferably located in the liquid, in order to be heated by it. The sample container, for example a test tube, can consequently be filled with the sample to be investigated outside the pressure vessel and subsequently simply placed into the reaction chamber.

The at least one sample container preferably has a stirring magnet for stirring a sample received in the sample container. The stirring magnet is in this case provided with respect to the magnetic disk in such a way that, for stirring the sample, the stirring magnet is set in motion by the rotating magnetic field and/or by the rotating magnetic field obtained because of rotation of the magnetic disk. That is to say that the rotating magnetic fields of the magnet arrangement and/or of the magnetic disk move or rotate in relation to the stirring magnet, whereby the stirring magnet is set in motion or rotation. Consequently, the rotating magnetic field and/or the rotating magnetic field obtained because of rotation of the magnetic disk can be used at the same time for the stirring of the stirring magnet. Additional means for moving the stirring magnet can consequently be omitted.

Preferably, the at least one sample container is held in the reaction chamber by way of a sample holder. By way of the sample holder, the at least one sample container is consequently held in the reaction chamber securely and in a defined position. What is more, the sample container can be easily removed from the pressure vessel by means of the sample holder. It is preferred if the sample holder is mounted on a region of the plate for mounting the sample holder. Further means for the secure and defined mounting of the sample holder can consequently be omitted.

Advantageously, the magnet arrangement has one or more electromagnets, preferably magnetic coils, preferably arranged over the circumference, preferably in a uniformly distributed manner. As a result, the rotating magnetic field can be generated particularly easily, to be specific by corresponding activation of the electromagnet or electromagnets. If the electromagnet is also formed as a magnetic coil, the electromagnet can be provided particularly flexibly with respect to the pressure vessel, and in particular with respect to the magnetic disk.

Preferably, the electromagnet is provided (obliquely) above, laterally next to or (obliquely) below the magnetic disk, particularly preferably in, on or close to the pressure vessel base or the pressure vessel wall. In such a position, the electromagnet is easily accessible for being assembled with the pressure vessel. What is more, in this way the overall width of the pressure vessel is reduced. Moreover, in this way the rotating magnetic field can act well on the magnetic disk.

The electromagnet may be provided in a bore provided in the pressure vessel wall and extending in the direction of the magnetic disk. In this way, the electromagnet can be easily brought into connection with the pressure vessel. What is more, the electromagnet can as a result be brought even closer to the magnetic disk, so that the magnetic effect on the magnetic disk, and consequently the rotation of the magnetic disk, is improved. The bore is in this case made small enough to have no influence on the pressure-receiving pressure vessel wall.

Preferably, the electromagnet can be screwed into the bore. In other words, the electromagnet may be at least partially configured as a screw, in order to be screwed into the bore provided with a thread. In this way, the electromagnet can be easily brought into connection with the pressure vessel, in particular fastened. What is more, the electromagnet can as a result be exchanged in an easy way. Moreover, the distance from the magnetic disk can be easily varied by the screwing movement of the electromagnet, so that for example a stronger or smaller magnetic effect with respect to the magnetic disk can be set.

The magnet arrangement may have at least one permanent magnet provided rotatably, in particular rotatably about the magnetic disk, so that the rotating magnetic field for rotationally driving the magnetic disk is generated by the turning of the permanent magnet. Thus, the rotating magnetic field can be easily generated, in particular without activation of electromagnets. Moreover, the at least one permanent magnet can be easily exchanged and serviced.

The magnet arrangement may have a permanent magnet receptacle, preferably in the form of a ring, in which the at least one permanent magnet is received for turning or rotating the at least one permanent magnet. By way of the permanent magnet receptacle, the at least one permanent magnet can for example be easily provided in the magnet arrangement from outside the pressure vessel. It is preferred if the permanent magnet receptacle receives/has a number of permanent magnets, which are preferably arranged uniformly distributed over the circumference of the permanent magnet receptacle; particularly preferably arranged with each pole or polarity lying opposite one another or in sectors of a circle lying opposite one another, and distributed over an angle of in each case 120-180°, preferably 160-180°. In this way, the magnetic disk can turn uniformly as a result of turning of the permanent magnet receptacle.

The magnet arrangement may have a drive for driving the at least one permanent magnet or the permanent magnet arrangement, so that the permanent magnet or magnets rotate(s)/turn(s) in such a way as to generate the rotating magnetic field.

Preferably, the magnetic disk has at least two, preferably three, particularly preferably four, magnetic elements for magnetizing the magnetic disk. In this way, a particularly uniform rotation of the magnetic disk can be brought about. It is preferred if the at least two magnetic elements are distributed uniformly around the axis of rotation of the magnetic disk. This in turn is conducive to a uniform rotation of the magnetic disk.

Preferably, one of the at least one passage bore is provided between two magnetic elements, seen in plan view or sectional view of the magnetic disk. In this way it can be prevented that the passage bore influences the magnetic elements or the magnetization of the magnetic disk. Moreover, the magnetic disk can consequently be configured with reduced weight, while having the same magnetization.

Preferably, the at least two magnetic elements are in each case a magnetic column. In this way, the magnetic elements can be easily produced, and easily provided in the magnetic disk. In particular, in this way the magnetic column can be easily inserted into the magnetic disk or embedded in it.

The pressure vessel may have furthermore a microwave generator, which is provided in such a way that microwaves generated by the microwave generator are coupled into the reaction chamber at least by way of the magnetic field generated by the electromagnet. The magnetic field consequently interacts with the microwaves, in order for example to couple the microwaves uniformly into the reaction chamber, and consequently uniformly into the liquid to be heated. What is more, a particularly compact pressure vessel is obtained as a result, since the microwave generator can consequently be provided in the vicinity of the electromagnet.

The invention is described by way of example below on the basis of the drawings, in which advantageous exemplary embodiments of the invention are represented and in which:

DETAILED DESCRIPTION OF THE PREFERRED EMBODIMENTS

Figure 1:
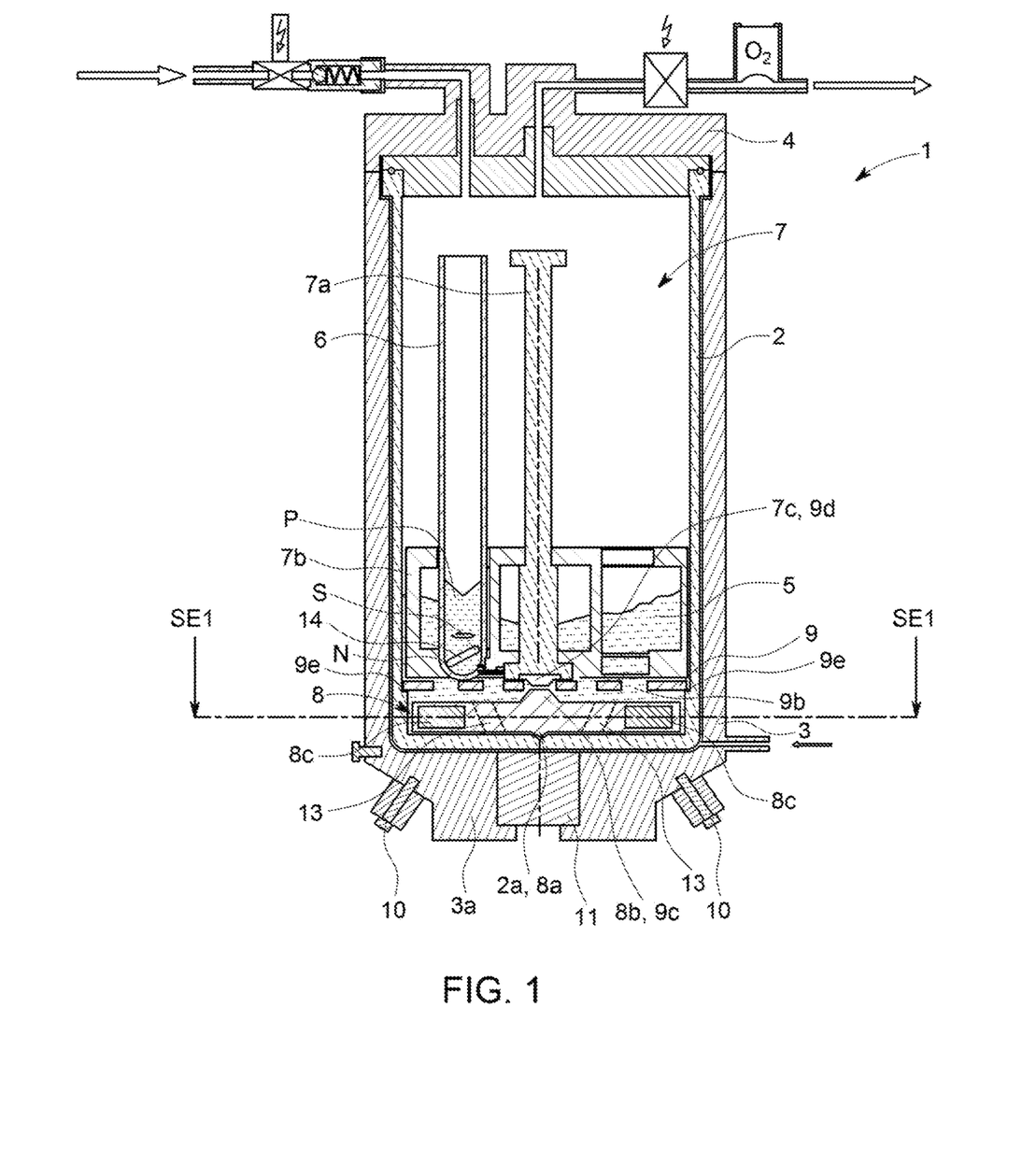
FIG. 1 shows a schematic sectional view of an exemplary embodiment of the pressure vessel according to the invention.

FIG. 1 shows an embodiment, given by way of example, of a pressure vessel 1 according to the invention for receiving samples P to be heated for the initiation and/or facilitation of chemical and/or physical pressure reactions on the samples P. The sample P may for example comprise solid substances such as sand, soil, earth and/or leaves. The pressure vessel 1 is not however restricted to a specific sample P. In particular, any kind of samples can be subjected to a pressure reaction and heating in the pressure vessel 1, especially samples with high viscosity or many fractions of solid matter.

The pressure vessel 1 may be a (high-pressure) autoclave. The pressure vessel 1 preferably consists of a high-pressure-resistant material, such as for example metal, preferably steel, particularly preferably a corrosion-resistant high-grade steel alloy. The pressure vessel 1 is in this case preferably formed in such a way that it can be used at pressures up to at least 200 bar, preferably up to at least 500 bar, and at temperatures of up to and even above 300° C.

The pressure vessel 1 has furthermore a reaction chamber or a pressure space 2 for the initiation and/or facilitation of the chemical and/or physical pressure reactions on the samples P. It can be seen that the pressure vessel 1 surrounds the reaction chamber 2, to be precise preferably on all sides.

The sample or samples P is/are arranged in the reaction chamber 2 for the sample processing and can be removed from it, preferably through an opening.

The pressure vessel 1 preferably has a (pot-shaped) lower part 3 and a cover part 4, which can be closed together and in the closed state surround the reaction chamber 2 on all sides. Here, the cover 4 closes the opening provided in the pressure vessel 1, that is to say the lower part 3 of the pressure vessel 1, for introducing and removing the sample P. By means of the cover 4, the pressure vessel 1 and/or the reaction chamber 2 can consequently be opened and closed.

As can be seen in particular from FIG. 1, the reaction chamber 2 is furthermore designed to receive a liquid or base load 5. The liquid 5 is preferably water, but may also be or comprise any other highly microwave-absorbent liquid. The liquid 5 is in this case intended in particular for heating or warming the sample P located in the pressure vessel 1 or in the reaction chamber 2. This may take place for example in that the sample P is at least partially surrounded by the liquid 5, and a microwave generator that is not represented any more specifically warms the liquid 5 by microwave absorption.

The sample P may be provided in a sample container 6, such as for example a test tube. The sample P is preferably provided in the pressure vessel in such a way that the liquid 5 reaches at least up to part of the height of the sample P. It may however also be provided that the liquid 5 reaches beyond the height of the sample P. Preferably, the pressure vessel 1 or the reaction chamber 2 is designed to receive two or more samples P. In a corresponding way, a number of sample containers 6 may also be provided, that is to say at least one sample container 6 for receiving one sample P each.

Figure 6:
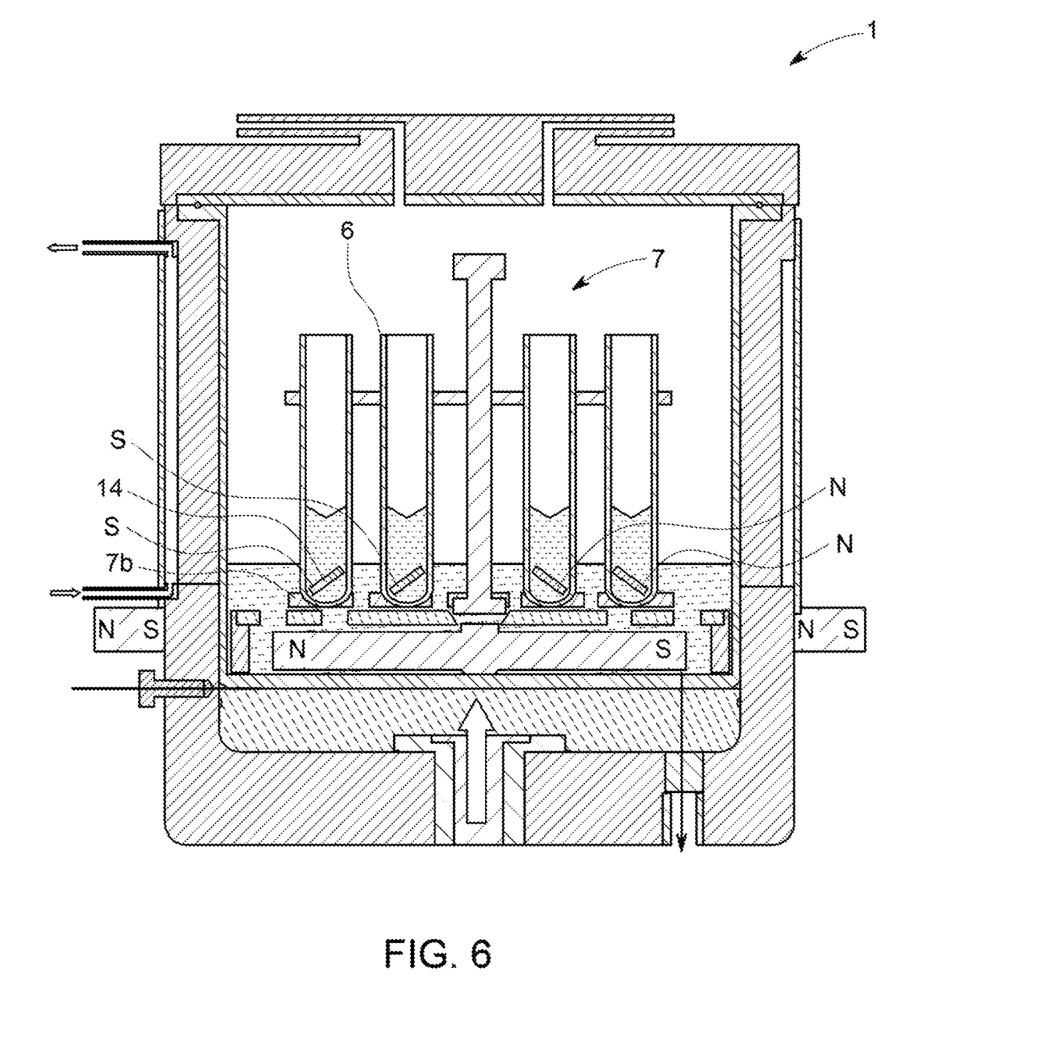
FIG. 6 shows a schematic view of a further embodiment of the sample holder.

The pressure vessel 1 may furthermore have a sample holder 7, with which the sample container 6 can be held in the reaction chamber 2. The sample holder 7 preferably carries the at least one sample container 6 in such a way that the sample container 6 is in the liquid 5. The sample holder 7 is in particular designed to place the at least one sample P or the at least one sample container 6 into the reaction chamber 2, and remove it again from the latter, for example by way of a handle 7a. The sample holder 7 may furthermore have a sample container receiving region 7b, which is preferably designed so as to correspond to the sample container 6. The sample container receiving region 7b may have a number of regions, in order for a sample container 6 to be received by a respective region. The sample container receiving region 7b has the effect here in particular that the sample containers 6 are provided in a specific pattern, that is to say for example are arranged in the form of a circle around the handle 7a. As can be seen in FIG. 1, the sample containers may for example be arranged on a single circle around the handle 7a. As can be seen in FIG. 6, the sample holder 7 may receive a number of sample containers 6, also on different radii or circles around the handle 7a. The sample container receiving region 7b may in particular be designed so as to correspond to the inner wall of the reaction chamber 2, in order in this way to hold the sample holder 7 in the reaction chamber 2 in a defined manner.

The pressure vessel 1 has furthermore a magnetic disk 8, which is mounted in the reaction 1o chamber 2 so as to be rotatable about an axis of rotation. The magnetic disk 8 has a form typical of a disk, that is to say in particular a flat and/or (circularly) round form. The magnetic disk 8 is provided in the reaction chamber 2 in such a way that— when the liquid 5 is present in the reaction chamber 2—the magnetic disk 8 is provided in the liquid 5. In particular, the magnetic disk 8 may be provided in a lower region of the reaction chamber 2, preferably on the base of the reaction chamber 2. The magnetic disk 8 preferably extends substantially over the entire base surface of the reaction chamber 2, and consequently leaves only a small gap between the magnetic disk 8 and the reaction chamber 2. The reaction chamber 2, preferably the base of the reaction chamber 2, may have a bearing region 2a, by way of which the magnetic disk 8 can be mounted in the reaction chamber 2, in particular in such a way that the magnetic disk is (only) movable or rotatable about its axis of rotation. The bearing region 2a is preferably designed so as to correspond to a bearing region 8a formed on the magnetic disk 8. That is to say that the magnetic disk 8 may be rotatably mounted in the reaction chamber 2 by way of the bearing regions 2a, 8a of the reaction chamber 2 and of the magnetic disk 8, respectively. For example, the bearing region 2a may be provided as a clearance or bore, while the bearing region 8a of the magnetic disk 8 is formed in a corresponding way, for example as a projection, and engages in this clearance.

Figure 4:
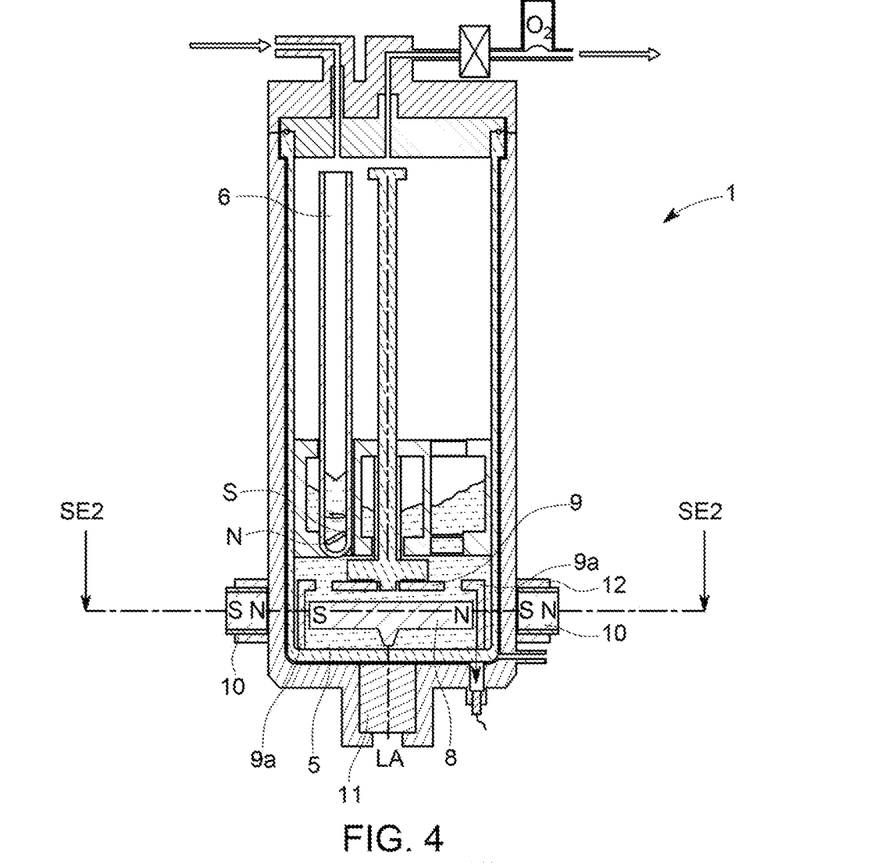
FIG. 4 shows a schematic sectional view of a further exemplary embodiment of the pressure vessel according to the invention.

The pressure vessel 1 may furthermore have a plate (disk) or a pedestal 9, which is provided in the reaction chamber 2 and is permeable to the liquid 5. It can be seen that the plate 9 defines with the reaction chamber 2, in particular with the base of the reaction chamber 2, a space in which the magnetic disk 8 is mounted. For this, the plate 9 may for example be placed in the reaction chamber 2 and/or be connected to the side walls of the reaction chamber 2, for example in that the plate 9 rests on a projection or on a step 9e of the reaction chamber 2 (compare FIG. 1). As can be seen in FIG. 4, it may however also be provided that side walls 9a, which are connected to the base of the reaction chamber 2, extend away from the plate 9. That is to say that the plate 9 may also form with the side walls 9a a cage, within which the magnetic disk 8 is provided and mounted.

The plate 9 provided in the liquid 5 is permeable to the liquid 5, for example by way of holes or passage openings 9b. The holes 9b are preferably arranged uniformly distributed over the surface of the plate 9. It is preferred if the plate 9 is produced from a ceramic material, such as for example silicon carbide. Since these materials are highly microwave-absorbent, the plate 9 provided in the liquid 5 can consequently be heated by means of microwave radiation, so that the liquid 5 is heated both directly by way of microwave absorption and indirectly by way of heat dissipation from the plate 9.

In particular in FIG. 1, it can be seen that the plate 9 may have a (further) bearing region 9c for mounting the magnetic disk 8. For this, the bearing region 9c is preferably designed so as to correspond to a (further) bearing region 8d of the magnetic disk 8. For example, the bearing region 9b of the plate 9 may be formed as an opening or clearance, the bearing region 8b of the magnetic disk 8 being formed in a corresponding way, for example as a projection, and engaging in this opening or clearance. It may also be provided that one of the holes 9b for the flowing through of the liquid 5 serves as a bearing region for the magnetic disk 8, in that the magnetic disk 8 has as a bearing region 8b a projection, which is designed to engage in the opening 9b in order in this way to be rotatable about the axis of rotation.

The plate 9 may furthermore have a bearing region 9d for the mounting or holding of the sample holder 7. It may be provided that the bearing region 9d of the plate 9 is designed so as to correspond to a bearing region 7c of the sample holder 7. For example, the bearing region 9d is provided as an opening or clearance, the bearing region 7c being formed in a corresponding way, for example as a projection, and engaging in the aforementioned opening or clearance. In particular, it may be provided that one of the holes 9b of the plate 9, preferably the one of the holes 9b for mounting the magnetic disk 8, forms the bearing region 9d, in that the bearing region 7c formed as a projection engages in the respective hole 9b. In other words, one of the holes 9b may form the bearing region both for the sample holder 7 and for the magnetic disk 8. The bearing region 9d or 7c has the effect here in particular that the sample holder is arranged in the reaction chamber 2 in a defined position and preferably immovably.

The pressure vessel 1 has furthermore at least one magnet arrangement, which is provided outside the reaction chamber 2 and in the exemplary embodiments shown in the figures has by way of example at least one electromagnet 10. Preferably, the pressure vessel 1 has, as represented, a number of electromagnets 10, which are preferably arranged uniformly distributed around the aforementioned axis of rotation or around the circumference of the reaction chamber 2. By means of the at least one electromagnet 10, a magnetic field that is rotating (in a circle) is formed for rotationally driving the magnetic disk 8 about its axis of rotation. For this, the at least one electromagnet 10 is preferably designed so as to correspond to a stator of a synchronous or stepping motor. To generate the rotating magnetic field, the pressure vessel 1 may have a control unit, which is not represented any more specifically and is functionally connected to the at least one electromagnet 10. The control unit preferably controls the electromagnets 10 in a way as known in the case of synchronous motors or stepping motors, that is to say for example in a sinusoidal manner. The control unit may in particular be designed to control an alternating current fed into the electromagnets 10, that is to say in particular to set the frequency of the alternating current. By way of setting the frequency of the alternating current, the rotational speed of the magnetic field, and consequently the rotational speed of the magnetic disk, can consequently be changed/varied.

The electromagnet 10 is preferably a magnetic coil or field coil and/or is formed as a field coil ring. The electromagnet 10 may however also be any other element for generating a magnetic field or a rotating magnetic field. Preferably, the electromagnet 10 is produced from a ferromagnetic material. Preferably, the electromagnet 10 is connected fixedly or reconnectably to the outer wall of the pressure vessel 1. As can be seen in FIG. 1, the electromagnet 10 is preferably provided (obliquely) below the magnetic disk 8. For this, it may in particular be provided that the electromagnet 10 is provided in the lower housing part 3, preferably in the pressure vessel base 3a. It can be seen in particular that the electromagnet 10 may be provided next to the (pressure-tight) microwave coupling-in 11. By providing the electromagnet 10 (obliquely) below the magnetic disk 8, it is accomplished in particular that the electromagnet 10 is easily accessible from below the pressure vessel 1, in order for example to easily mount the electromagnet 10. In principle, the electromagnet may also be provided at some other position, for example laterally in relation to the magnetic disk 8 or else (obliquely) above the same.

Figure 2:
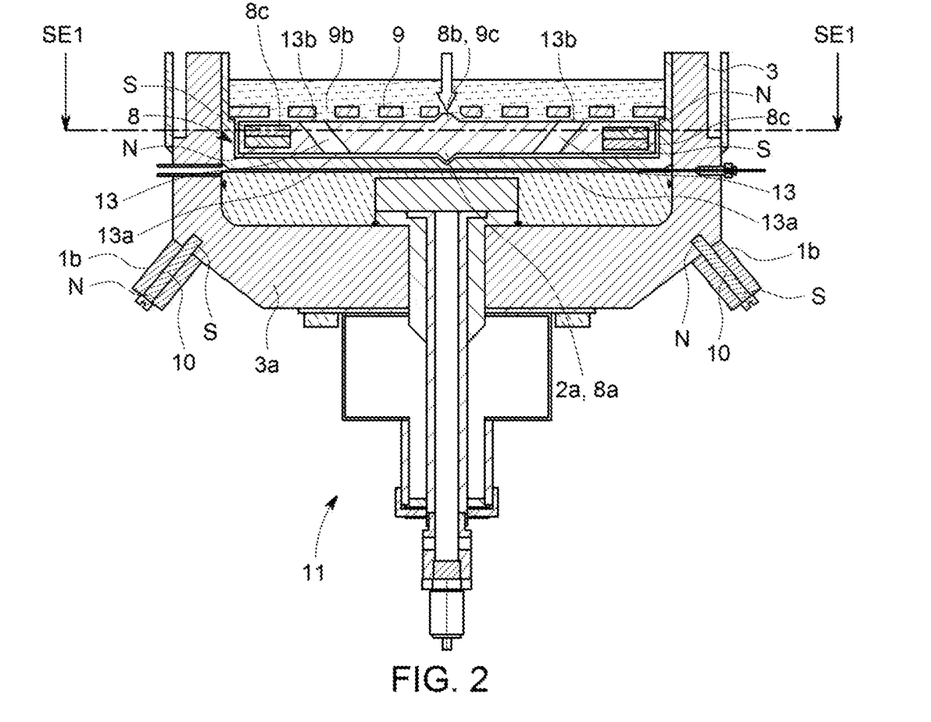
FIG. 2 shows a view of a detail of an excerpt of the pressure vessel shown in FIG. 1.

As can be seen in particular in FIG. 2, the electromagnet 10 may be provided in a bore 1b provided in the pressure vessel wall and extending in the direction of the magnetic disk 8. It can be seen in particular that the bore 1b is accessible from outside the pressure vessel 1, in order in this way to provide the electromagnet 10 in the pressure vessel wall easily from outside the pressure vessel 1. It is preferred if the electromagnet 10 can be screwed into the bore 1b. To be more specific, the electromagnet 10 may be at least partially designed in the form of a screw, in order to be screwed into the bore 1b, which is then provided with a thread. By movement of the electromagnet 10 in the bore 1b, i.e. in particular by the screwing movement of the electromagnet 10 in the bore 1b, the electromagnet 10 can be moved in the direction of the magnetic disk 8 or the distance between the electromagnet 10 and the magnetic disk 8 can be varied. Consequently, the distance between the magnetic disk 8 and the electromagnet 10 can in particular be reduced, in order in this way to intensify the magnetic effect of the electromagnet 10 on the magnetic disk 8, so that more effective driving of the magnetic disk 8 is achieved. In FIGS. 1 and 2, it can be seen furthermore that the bore 1b may extend obliquely in relation to the axis of rotation of the magnetic disk 8. It may however also be provided that the bore 1b extends at some other angle, in particular parallel to the axis of rotation. What is more, it may be provided that a number of the bores 1b are provided, intended in each case for one of the number of electromagnets 10.

The invention is not however thereby restricted to such an arrangement of the electromagnet 10. A further configuration for arranging the electromagnet 10 or of the number of electromagnets 10 outside the reaction chamber 2 is shown in FIGS. 4 and 5.

Figure 5:
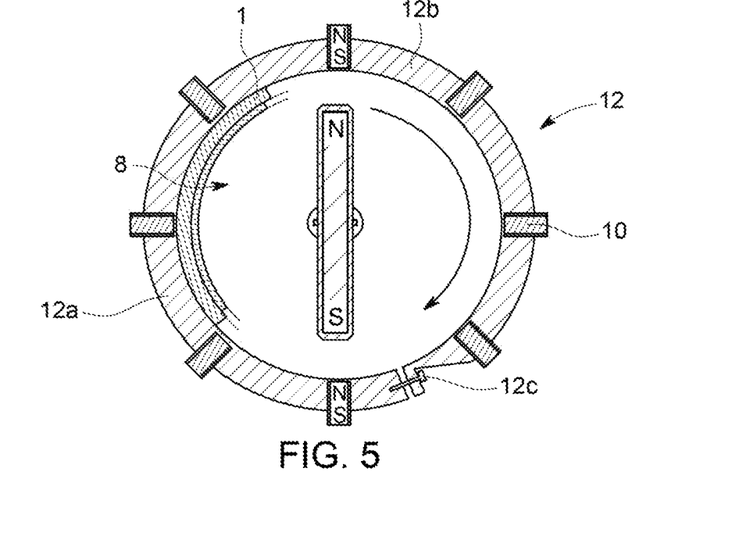
FIG. 5 shows a schematic sectional view of the pressure vessel shown in FIG. 4 along the sectional line SE2.

In FIGS. 4 and 5, it can be seen that the at least one electromagnet 10 may be provided outside the reaction chamber 2, in that it is provided outside the pressure vessel 1. As shown by way of example, this may take place in that a clamp 12, reaching around the pressure vessel 1, receives the at least one electromagnet 10 in order to provide the at least one electromagnet 10 outside the reaction chamber 2 or the pressure vessel 1. Preferably, the clamp 12 receives a number of electromagnets 10, which may in particular be distributed (uniformly) over the circumference of the clamp 12. The clamp 12 preferably has a form corresponding to the outer wall of the pressure vessel 1, that is to say preferably a circularly round form. For receiving the at least one electromagnet 10, a clearance in which the electromagnet 10 can be provided, in particular inserted, may be provided in the clamp 12.

The clamp 12 preferably has two clamp halves 12a, 12b, which are movable in relation to one another in order to be brought into connection with the pressure vessel 1 or the outer wall of the pressure vessel 1. That is to say that the clamp halves 12a, 12b are preferably connected to one another in an articulated manner at one of their ends and can be (re-)connected or fastened to one another at the other of their ends or by way of their free ends. The free ends of the clamp halves 12a, 12b may for example be connected to one another with a fastening means 12c. The clamp 12 can therefore reach around the pressure vessel 1 or its outer wall, the clamp 12, in particular its inwardly directed surface, coming into at least force-fitting contact with the outer wall of the pressure vessel 1 as a result of tightening of the fastening means 12c, in order in this way to hold the at least one electromagnet 10 with respect to the magnetic disk 8. The fastening means 12c may be for example a screw, which can be led through the free end of the one clamp half 12b and is screwed in the other clamp half 12a, in order in this way to move the clamp halves 12a, 12b toward one another, so that they are pressed against the outer wall of the pressure vessel 1.

It is preferred if the clamp 12 is provided on the pressure vessel 1 in such a way that the electromagnet 10 received therein is level with the magnetic disk 8. The clamp 12 has the effect in particular that the at least one electromagnet 10 can be provided variably in its height with respect to the magnetic disk 8. By means of the clamp 12, the electromagnet 10 can in particular 30o be provided with respect to the magnetic disk 8 without structural modifications of the pressure vessel 1, in particular without structural modifications of the pressure vessel wall.

Figure 3:
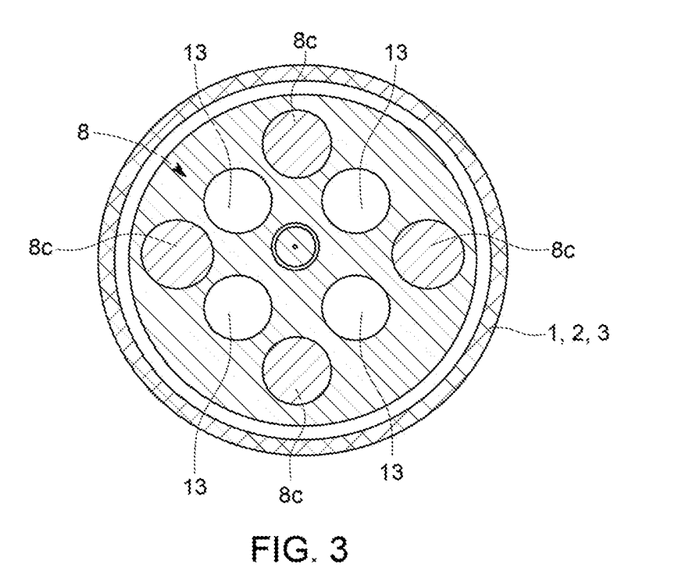
FIG. 3 shows a schematic sectional view of the pressure vessel shown in FIGS. 1 and 2 along the sectional line SE1.

Since the magnetic disk 8 is located in the rotating magnetic field brought about by the electromagnet 10, a rotational speed of the magnetic disk 8 that corresponds to the rotational speed of the magnetic field brought about by the electromagnet 10 will be established. With regard to the magnetization, the magnetic disk 8 is preferably designed so as to correspond to a rotor of a synchronous or stepping motor. For the magnetization of the magnetic disk 8, the magnetic disk 8 may have a permanent magnet and/or a separately excited magnet—that is to say a magnet that is operated by a supply of current. It is preferred if at least two, preferably three, particularly preferably four, magnetic elements 8c are provided for the magnetization of the magnetic disk 8. As can be seen in FIG. 3, the magnetic elements 8c are preferably arranged uniformly distributed around the axis of rotation of the magnetic disk 8. The angle, measured with respect to the axis of rotation of the magnetic disk 8, between two adjacent magnetic elements 8c, seen in the direction of rotation, may be 180° (when there are altogether two magnetic elements 8c), 120° (when there are altogether three magnetic elements 8c) or 90° (when there are altogether four magnetic elements 8c). The magnetic elements 8c are in this case preferably provided in such a way that—as represented by way of example in FIG. 2—one magnetic element 8c has a reversed polarity in relation to the next magnetic element 8c respectively, seen in the direction of rotation. The North-South or South-North polarity in this case preferably points in the direction of the electromagnet 10.

It may in particular be provided that the respective magnetic element 8c is designed as a magnetic column. The magnetic column preferably has a cylindrical form. Preferably, the magnetic disk 8 has a clearance or blind-hole bore corresponding to the magnetic column. In this way it can be provided that the magnetic column can be inserted or can be fitted into the magnetic disk 8 or into the clearance designed so as to correspond to the magnetic column, in order in this way to bring about for example easy changing of the magnetic elements 8c. The respective clearance may be provided horizontally (parallel), transversely or perpendicularly in relation to the axis of rotation of the magnetic disk 8. In this way, magnetic elements with a high magnetic density can be used. If the electromagnets 10 are provided below the magnetic disk 8, that is to say for example in the lower housing part 3 or in the pressure vessel base 3a, it is of advantage if the clearance is provided parallel to the axis of rotation. In this way, a high field strength of the magnetic elements 8c in the downward direction is brought about, so that the magnetic disk 8 can be driven more effectively. As an alternative or in addition, the magnetic elements 8c may also be embedded/encapsulated in the magnetic disk 8, in particular welded in, fused in and/or enclosed.

The magnetic disk 8 is not restricted to a specific material, but it is preferred if the magnetic disk 8 is produced from a ceramic material, such as for example silicon carbide. Since these materials are highly microwave-absorbent, the magnetic disk 8 provided in the liquid 5 can consequently be heated by means of microwave radiation, so that the liquid 5 is heated both directly by way of microwave absorption and indirectly by way of heat dissipation from the magnetic disk 8.

As can be seen in particular in FIGS. 1 and 2, the magnetic disk 8 has at least one passage bore (agitating bore) 13 extending transversely in relation to the axis of rotation of the magnetic disk 8. The passage bore 13 has on the underside and upper side of the magnet 8 in each case an opening 13a and 13b, respectively, the opening 13a preferably lying opposite the base of the reaction chamber 2, and the opening 13b preferably lying opposite the plate 2. The passage bore 13 is preferably provided in such a way that it passes through the magnetic disk 8 in an upward direction and away from the axis of rotation of the magnetic disk 8, and therefore the opening 13b is further away from the axis of rotation than the opening 13a. That is to say that the passage bore 13 passes through the magnetic disk 8 preferably in a direction which is radial in relation to the turning direction of the axis of rotation. It is particularly preferred if the respective passage bore 13 is of an entirely straight form, and its longitudinal axis is provided transversely in relation to the axis of rotation of the magnetic disk 8. The respective passage bore 8 is thus provided at an angle in relation to the axis of rotation of the magnetic disk 8, which preferably lies in a range from 10 to 80 degrees and particularly preferably is 45 degrees+/−5 to 10 degrees.

The passage bore 13 is provided in such a way that the liquid 5 received in the reaction chamber 2 is driven through the passage opening 13 by rotation of the magnetic disk 8 in order to stir the liquid 5. By means of the stirring effect, the liquid 5 is forced in an upward and outward direction, and consequently rises up on the inner wall of the reaction chamber 2. Consequently, seen in section, a substantially U-shaped liquid level is formed. The liquid 5 is therefore driven from one side of the magnetic disk 8, for example from its underside, to another side of the magnetic disk 8, for example to its upper side, in order in this way to allow the liquid 5 to circulate for the stirring. The liquid 5 circulates in the reaction chamber 2, in that it flows through the gap between the magnetic disk 8 and the plate 9, through the gap between the magnetic disk 8 and the base of the reaction chamber 2, through the gap between the magnetic disk 8 and the inner wall of the reaction chamber 2, and/or through the passage opening 8. The passage bore 8 therefore brings about a stirring or agitation of the liquid 5, whereby the liquid 5 is warmed more quickly and uniformly and the sample P is consequently heated more efficiently.

To intensify the aforementioned stirring effect, it is preferred if the magnetic disk 8 has a number of, that is to say at least two, preferably three, particularly preferably four, passage bores 13, which—as can be seen in FIG. 3—are preferably uniformly distributed around the axis of rotation of the magnetic disk 8. With respect to the magnetic elements 8, the at least one passage bore 13—seen in plan view or sectional view—is preferably provided between two magnetic elements 8c. To be more precise, the magnetic elements 8c may be arranged on a first circle around the axis of rotation of the magnetic disk, and the at least one passage bore 13 may be arranged on a second circle around the axis of rotation, the radius of the second circle preferably being smaller than the radius of the first circle. Seen in plan view, the passage bore 13 or an opening of the passage bore 13 in this case overlaps with the first circle at a point at which no magnetic element 8c is provided, so that the respective magnetic element 8c is not influenced.

The passage bore 13 may also be designed in such a way that the liquid 5 is driven through the passage bore 13 and, depending on the turning direction of the magnetic disk 8 about its axis of rotation, the direction of flow of the liquid 5 through the passage bore 13 is changed. If therefore the magnetic disk 8 is turned in one direction (thus for example clockwise), the liquid 5 is driven through the passage bore 8 in a direction from below to above, while in the case of turning of the magnetic disk 8 in the other direction (thus for example counterclockwise) the liquid 5 is driven through the passage bore 13 in a direction from above to below. That is to say that the vector of the extent of the passage bore 13 through the magnetic disk 8 may have a component tangential to the direction of rotation of the magnetic disk, i.e. the passage bore 13 may be provided for example askew to the axis of rotation of the magnetic disk 8. As a result of the tangential component, the liquid can then be driven through the passage bore because of the torque of the magnetic disk 8, and, depending on the turning direction of the magnetic disk 8, the direction of flow of the liquid 5 through the passage bore 13 can be set.

As can be seen in FIGS. 1 and 3, the respective sample container 6 may have a stirring magnet 14 for stirring a sample P received in the sample container 6. The stirring magnet 14 is preferably a permanent magnet with North-South polarity. The stirring magnet 14 preferably has an elongate form, in order in this way to stir the sample P over its length. The stirring magnet 14 may be designed to lie obliquely in the sample container 6. The stirring magnet 14 is preferably designed as a magnetic stirring bar. The stirring magnet 14 may however generally have any form that is suitable for stirring the sample P, that is to say for example also the form of a propeller or the like.

The stirring magnet 14 is provided with respect to the magnetic disk 8 in such a way that the stirring magnet 14 is set in motion by the rotating magnetic field of the electromagnet 10 and/or of the magnetic disk 8. For this, it is particularly of advantage if the stirring magnet 14 is provided in a (lower) part of the sample container 6 that is provided directly opposite the magnetic disk 8 and/or the plate 9, so that the magnetic field of the magnetic disk 8 acts well on the stirring magnet 14. The respective magnetic field of the magnetic disk 8 and/or of the electromagnet 10 therefore moves in relation to the sample container 6, whereby the stirring magnet 14 is set in motion or made to turn in a way that corresponds to the rotation of the respective magnetic field or the magnetic fields. By this movement, the sample P is consequently stirred by means of the stirring magnet 14, whereby in particular samples with high viscosity or many fractions of solid matter can be homogenized efficiently.

For warming or heating, in particular the liquid 5, the plate 9 and/or the samples P, the pressure vessel 1 may have any means for the direct or indirect dissipation of heat. It is preferred if the pressure vessel 1 has a microwave generator, which is not represented any more specifically and couples microwaves into the reaction chamber 2 by way of the microwave coupling-in region 11. The generated microwaves in this case enter the reaction chamber 2 preferably by way of the magnetic field of the magnetic disk 8 and/or of the electromagnet 10, so that the magnetic field can interact with the coupled-in microwaves, in order for example to bring about an advantageous diversion of the microwaves.

Instead of the electromagnet 10 as described above, according to an exemplary embodiment that is not represented any more specifically, the magnet arrangement may also have a rotatably provided permanent magnet described as follows, so that the rotating magnetic field for rotationally driving the magnetic disk is generated by the turning or rotation of the permanent magnet. Unless otherwise described below, the statements made above with respect to the electromagnet 10 apply analogously to such a magnet arrangement.

The magnet arrangement may have a permanent magnet receptacle, in which the at least one permanent magnet is received for turning the at least one permanent magnet. The permanent magnet receptacle preferably (partially) surrounds the reaction chamber, particularly preferably the pressure vessel. The permanent magnet receptacle may have a form corresponding to the reaction chamber and/or the pressure vessel, for example an annular cross section, or it is formed as a ring. The permanent magnet receptacle preferably receives a number of, in particular two, permanent magnets. For each permanent magnet, the permanent magnet receptacle may have a receptacle corresponding to the respective permanent magnet, in which the respective permanent magnet can be inserted or can be fitted. Alternatively, it may also be provided that the at least one permanent magnet is embedded in the permanent magnet receptacle.

If the magnet arrangement or the permanent magnet receptacle has a number of permanent magnets, they are preferably arranged uniformly distributed over the circumference of the permanent magnet receptacle. The arrangement of the permanent magnets is preferably such that the polarity of the permanent magnets alternates, that is to say alternately positively and negatively charged permanent magnets are provided along the circumference. For example, the cross section of the permanent magnet receptacle may be divided into sectors (of a circle), the sectors alternately having at least one or a group of permanent magnets with a positive polarity (preferably 6 to 8 of them) and at least one or a group of permanent magnets with a negative polarity (preferably 6 to 8 of them). For a particularly high field strength of the magnetic field, it may be provided that two sectors of a circle are provided, preferably lying directly opposite one another, in each case with an inscribed angle in the range from 120° to 180°, preferably in the range from 160° to 180°, a first sector of the circle having at least one or more (for example the aforementioned 6 to 8) permanent magnets with a positive polarity, and a second sector of the circle having at least one or more (for example the aforementioned 6 to 8) permanent magnets with a negative polarity. It is preferred if the respective permanent magnets of each sector of the circle are arranged uniformly distributed over the respective sector (of the circle), so that a particularly high and uniform field strength of the magnetic field is achieved.

The permanent magnet receptacle may consist of any material that is suitable for receiving the at least one permanent magnet. Preferred materials are polypropylene (PP), aluminum (Al) and/or plastics in general, since with these materials a particularly low weight can be achieved.

The magnet arrangement may furthermore have a drive for driving the at least one permanent magnet or the permanent magnet receptacle, so that the permanent magnet or the permanent magnet receptacle turns/rotates, in order to generate the rotating magnetic field. It is preferred if the drive turns the permanent magnet receptacle, in order to turn/rotate the permanent magnet as described above. For this, it may be provided that a corresponding transmission means (gear wheel, gear mechanism etc.) is provided between the drive and the permanent magnet receptacle, in order to transmit the driving force of the drive to the permanent magnet receptacle, and consequently the permanent magnet.

The invention is not thereby restricted to the features described above. In particular, all of the features described above may be combined with one another in any desired way.

The invention claimed is:

1. Pressure vessel (1) for receiving samples (P) to be heated, having
    a reaction chamber (2) as a pressure space for the initiation and/or facilitation of chemical and/or physical pressure reactions, the reaction chamber (2) being designed for receiving a liquid (5),
    a magnetic disk (8) mounted rotatably about an axis of rotation in the reaction chamber (2), and
    a magnet arrangement (10), provided outside the reaction chamber (2), for generating a rotating magnetic field for rotationally driving the magnetic disk (8) about its axis of rotation,
    the magnetic disk (8) having at least one passage bore (13), which extends transversely in relation to the axis of rotation and is provided in such a way that liquid (5) received in the reaction chamber (2) is driven through the passage opening (13) by rotation of the magnetic disk (8) in order to stir the liquid (5), and
    wherein the pressure vessel further comprising a plate (9), which is provided in the reaction chamber (2) and is permeable to the liquid (5), wherein the plate (9) defines with the reaction chamber (2) a space in which the magnetic disk (8) is mounted.

2. Pressure vessel (1) according to claim 1, wherein the at least one passage bore (13) passing through the magnetic disk (8) at least partly in an upward direction and away from the axis of rotation or toward the axis of rotation.

3. Pressure vessel (1) according to claim 1, wherein the at least one passage bore (13) passing through the magnetic disk (8) at least partly in a direction inclined tangentially to or counter to the turning direction about the axis of rotation.

4. Pressure vessel (1) according to claim 1, wherein the at least one passage bore (13) passing through the magnetic disk (8) at least partly in a direction inclined radially toward or away from the axis of rotation.

5. Pressure vessel (1) according to claim 1, wherein the magnetic disk (8) having at least two passage bores (13).

6. Pressure vessel (1) according to claim 1, wherein the plate (9) is permeable to the liquid (5) by way of holes (9b).

7. Pressure vessel (1) according to claim 6, wherein the plate (9) being produced from a ceramic material.

8. Pressure vessel (1) according to claim 6, wherein the reaction chamber (2) and/or the plate (9) having a region (2a, 9c) for mounting the magnetic disk (8).

9. Pressure vessel (1) according to claim 1 further comprising at least one sample container (6) for receiving the sample (P), the sample container (6) being held in the reaction chamber (2) in order to be warmed by the liquid (5) received in the reaction chamber (2) when the liquid (5) has been received in the reaction chamber (2).

10. Pressure vessel (1) according to claim 9, wherein the at least one sample container (6) having a stirring magnet (14) for stirring a sample (P) received in the sample container (6), and the stirring magnet (14) being provided with respect to the magnetic disk (8) in such a way that, for stirring the sample (P), the stirring magnet (14) is set in motion by the rotating magnetic field and/or by the rotating magnetic field obtained because of rotation of the magnetic disk (8).

11. Pressure vessel (1) according to claim 9, wherein the at least one sample container (6) being held in the reaction chamber (2) by way of a sample holder (7).

12. Pressure vessel (1) according to claim 1, wherein the magnet arrangement having one or more electromagnets (10).

13. Pressure vessel (1) according to claim 12, wherein the electromagnet (10) being provided below, obliquely below or laterally in relation to the magnetic disk (8).

14. Pressure vessel (1) according to claim 12, wherein the electromagnet (10) being provided in a bore (1b) provided in the pressure vessel wall and extending in the direction of the magnetic disk (8).

15. Pressure vessel (1) according to claim 1, wherein the magnet arrangement having at least one permanent magnet provided rotatably, in particular rotatably about the magnetic disk (8), so that the rotating magnetic field for rotationally driving the magnetic disk (8) is generated by the turning of the permanent magnet.

16. Pressure vessel (1) according to claim 15, wherein the magnet arrangement having a permanent magnet receptacle, in which the at least one permanent magnet is received for turning or rotating the at least one permanent magnet.

17. Pressure vessel (1) according to claim 15, wherein the magnet arrangement having a drive for driving the at least one permanent magnet or the permanent magnet receptacle, so that the permanent magnet or magnets rotate(s) in such a way as to generate the rotating magnetic field.

18. Pressure vessel (1) according to claim 1, wherein the magnetic disk (8) having at least two magnetic elements (8c) for the magnetization of the magnetic disk (8).

19. Pressure vessel (1) according to claim 18, wherein one of the at least one passage bore (13) being provided between two magnetic elements (8c), seen in plan view of the magnetic disk (8).

20. Pressure vessel (1) according to claim 18, wherein the at least two magnetic elements (8c) being in each case a magnetic column.

21. Pressure vessel (1) according to claim 1, further comprising a microwave generator, which is provided in such a way that microwaves generated by the microwave generator are coupled into the reaction chamber (2) at least by way of the magnetic field generated by the magnet arrangement (10).

\* \* \* \* \*

UNITED STATES PATENT AND TRADEMARK OFFICE
CERTIFICATE OF CORRECTION

| | | |
|---|---|---|
| PATENT NO. | : 11,464,086 B2 | |
| APPLICATION NO. | : 16/528913 | |
| DATED | : October 4, 2022 | |
| INVENTOR(S) | : Werner Lautenschläger, Jens Lautenschläger and Werner Scholze | |

It is certified that error appears in the above-identified patent and that said Letters Patent is hereby corrected as shown below:

On the Title Page

The Assignee is listed incorrectly, please correct as follows:
MWT AG, Heerbrugg (CH)

Signed and Sealed this
Tenth Day of January, 2023

Katherine Kelly Vidal
*Director of the United States Patent and Trademark Office*